Figure 8:
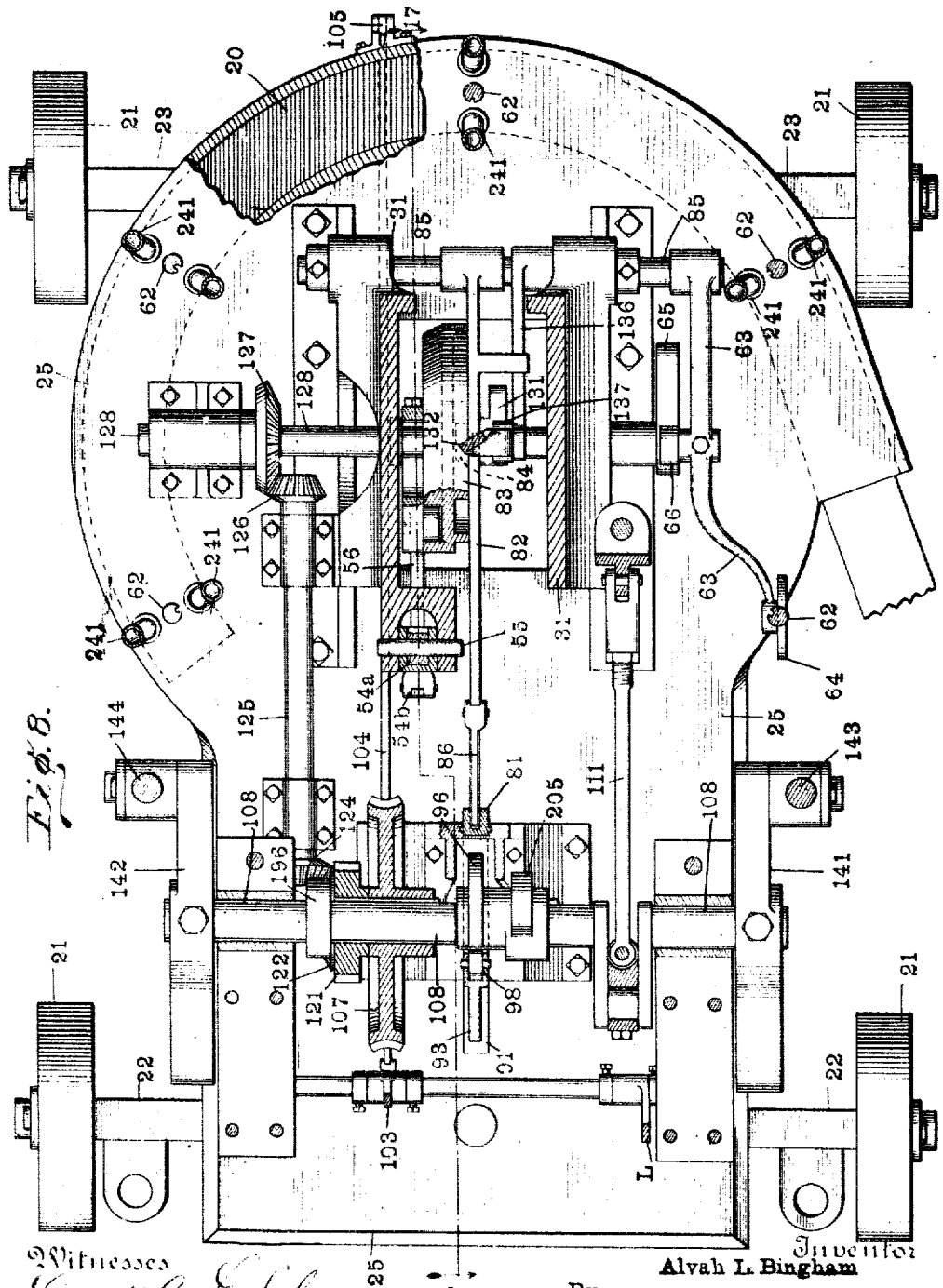

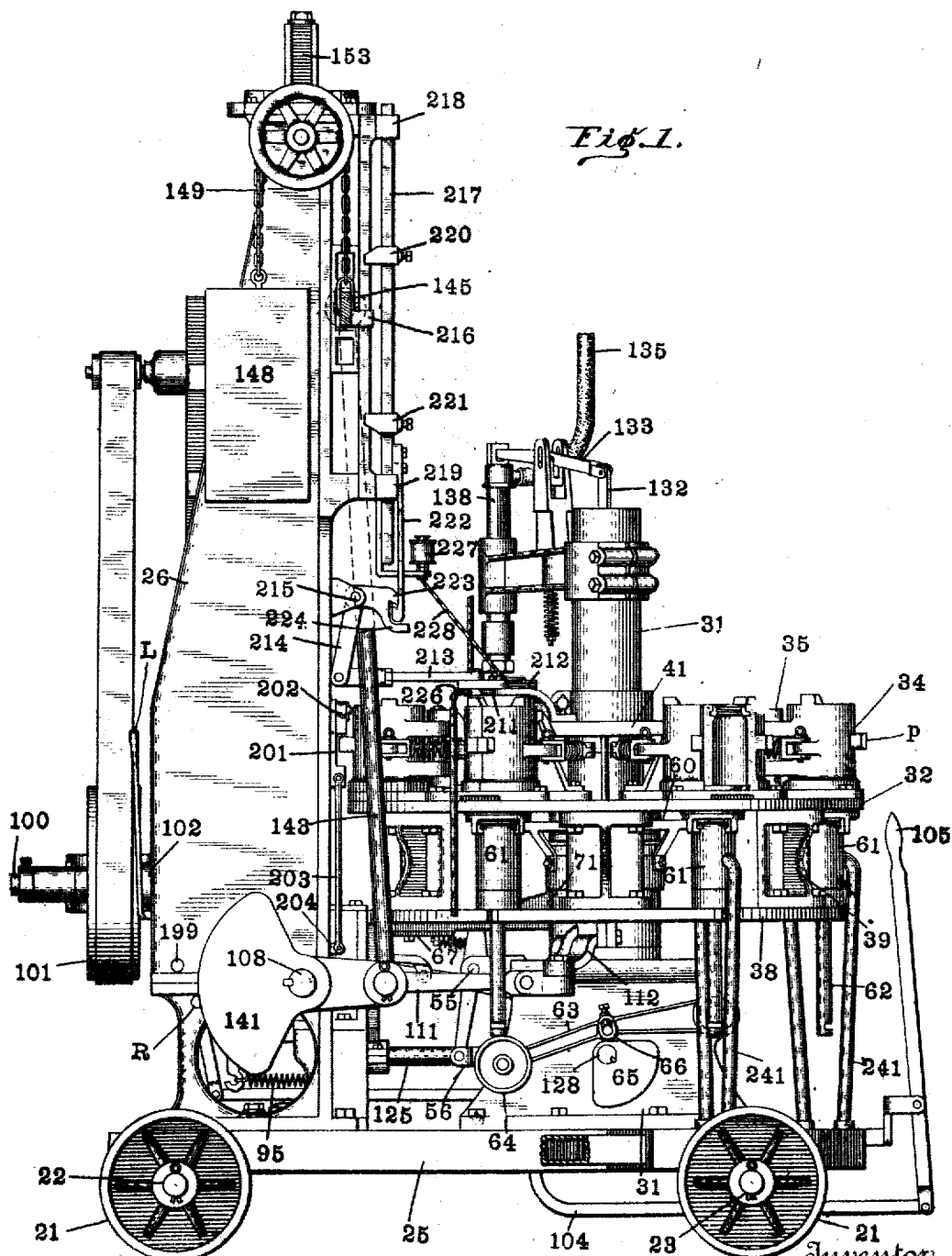

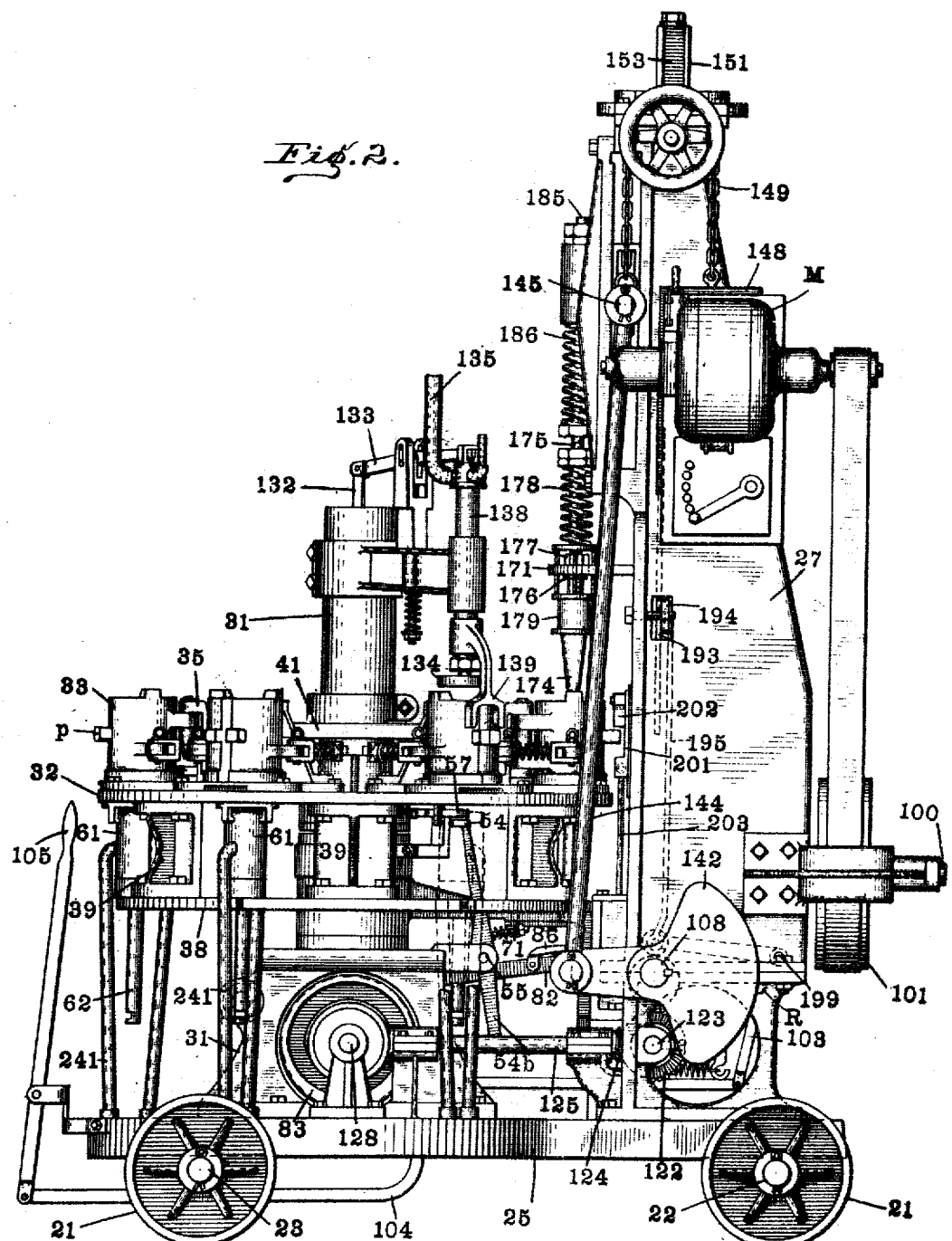

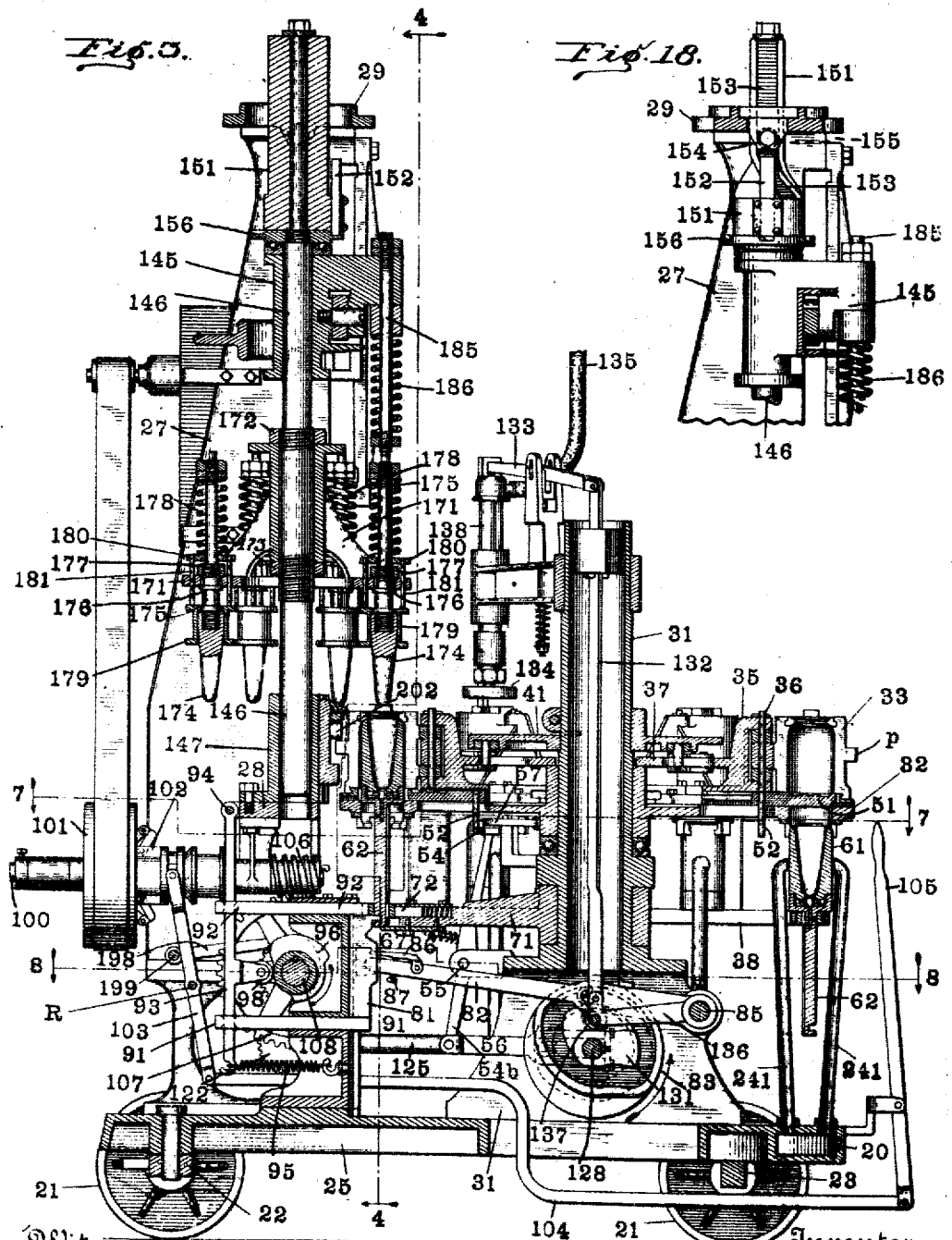

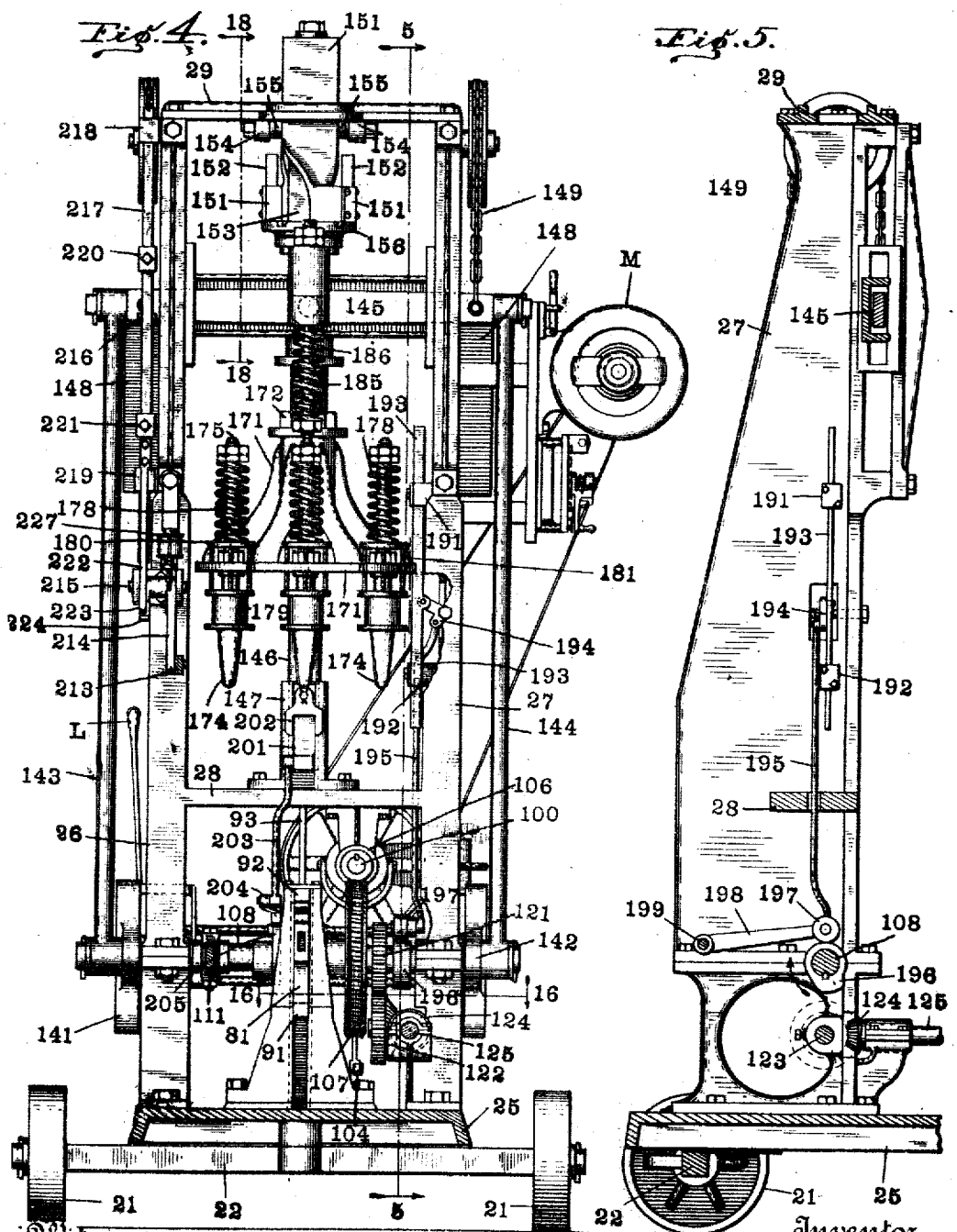

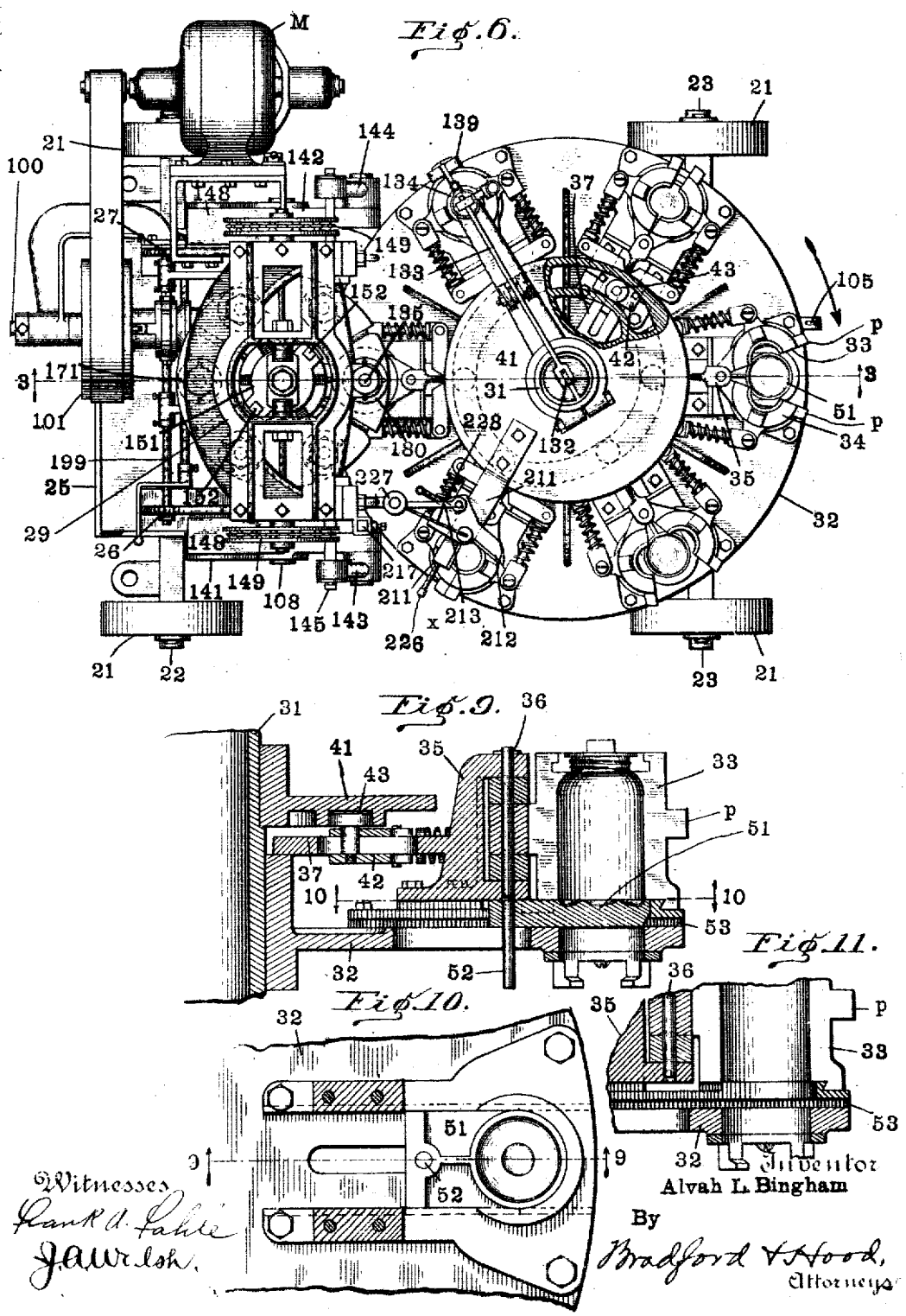

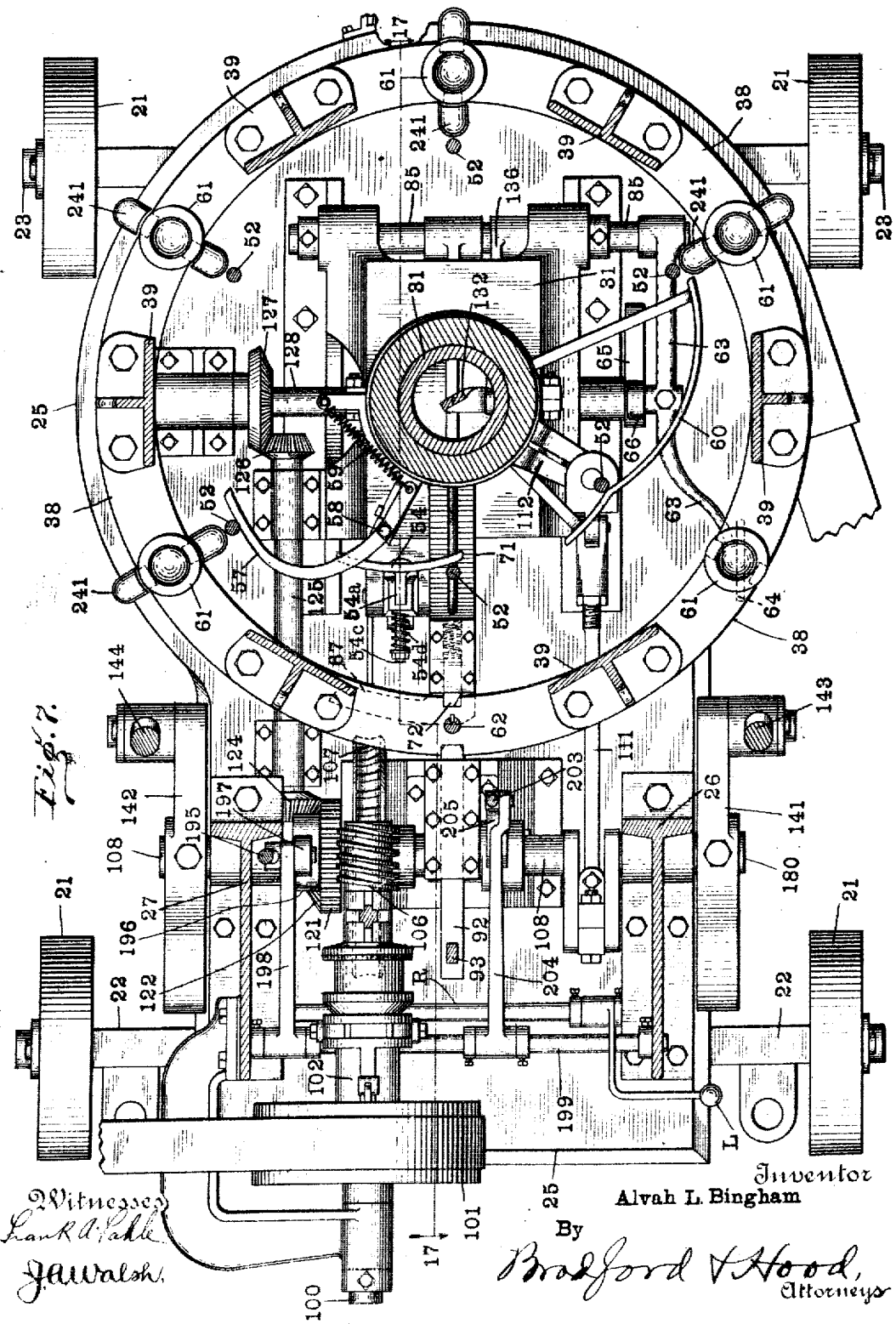

No. 817,745. PATENTED APR. 17, 1906.
A. L. BINGHAM.
GLASS BLOWING MACHINE.
APPLICATION FILED DEC. 12, 1904.

9 SHEETS—SHEET 7.

Witnesses
Frank A. Fahle
J. A. Walsh

Inventor
Alvah L. Bingham
By
Bradford & Hood,
Attorneys

No. 817,745. PATENTED APR. 17, 1906.
A. L. BINGHAM.
GLASS BLOWING MACHINE.
APPLICATION FILED DEC. 12, 1904.
9 SHEETS—SHEET 8.
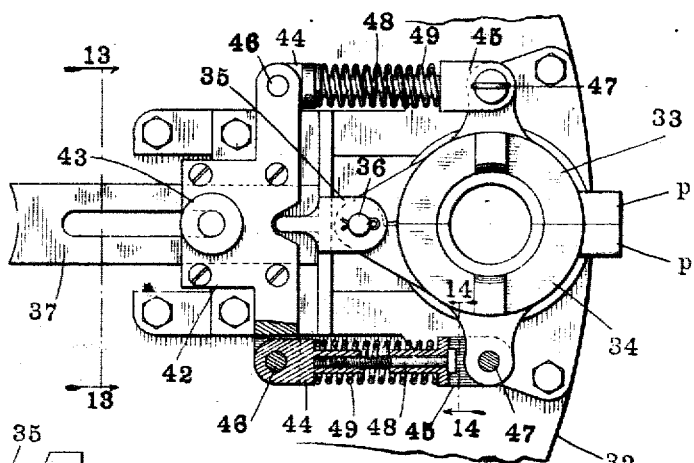
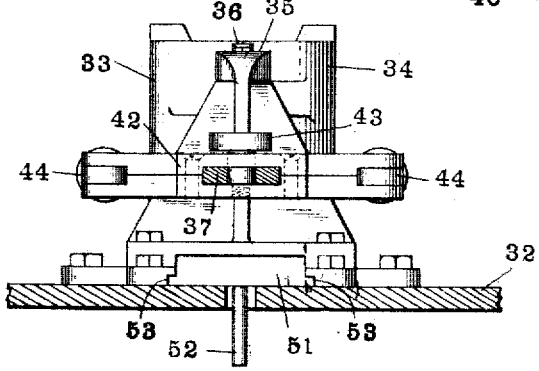
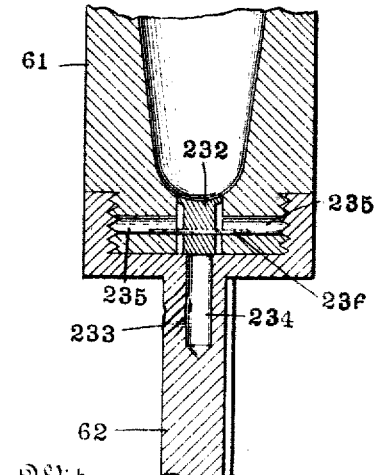
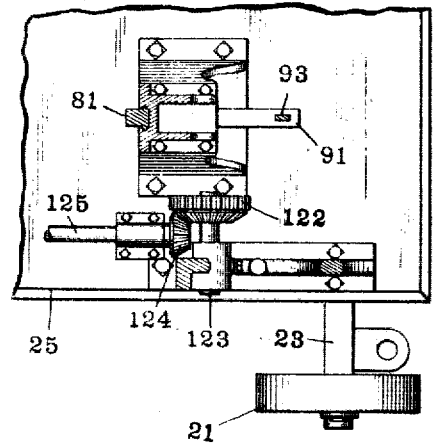
Inventor
Alvah L. Bingham
By Bradford & Hood,
Attorneys

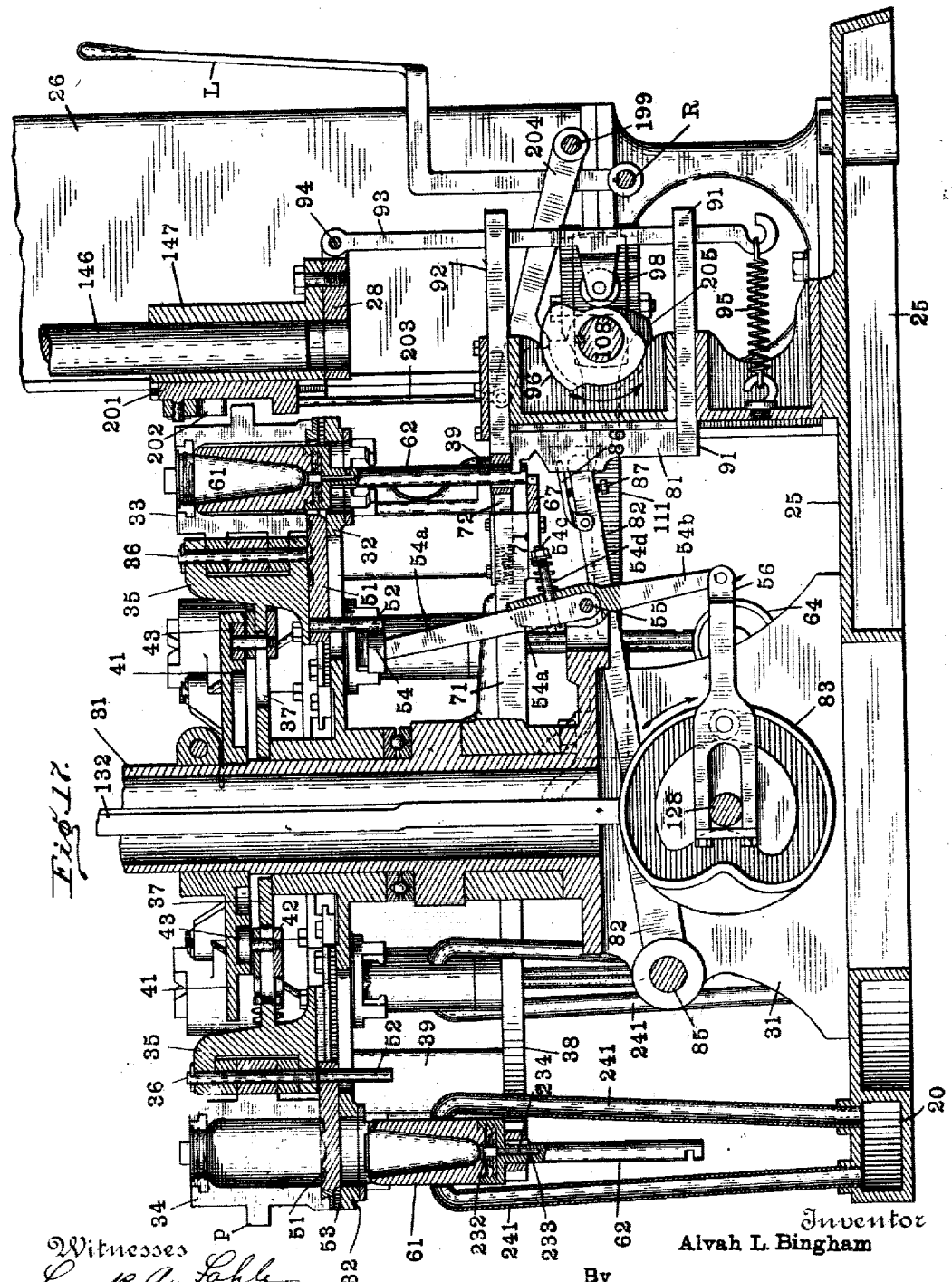

ual view showing a detail of the adjusting
UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-BLOWING MACHINE.

No. 817,745.     Specification of Letters Patent.     Patented April 17, 1906.

Application filed December 12, 1904. Serial No. 236,532.

*To all whom it may concern:*

Be it known that I, ALVAH L. BINGHAM, a citizen of the United States, residing at Muncie, in the county of Delaware and State of Indiana, have invented certain new and useful Improvements in Glass-Blowing Machines, of which the following is a specification.

My present invention relates to that variety of machines used in the work of producing hollow glassware known as "glass-blowing" machines; and it embodies improvements by means of which certain difficulties have been overcome and certain advantages attained, as will be hereinafter pointed out.

These improvements consist in numerous features of construction in such a machine and in various combinations of parts whereby the work in question is efficiently and expeditiously performed.

In the machine illustrated the molds and forming parts are shown as especially adapted to the production of fruit-jars; but by suitable variations in form and arrangement the machine may be adapted to the production of glassware of other kinds, as will be readily understood.

Referring to the accompanying drawings, which are made a part hereof and on which similar reference characters indicate similar parts, Figure 1 is a side elevation showing the left-hand side of the machine, the pressing-head being omitted and a portion of one of the connecting-rods being broken away for purposes of clearness; Fig. 2, a similar view showing the right-hand side of the machine; Fig. 3, a central vertical sectional view at the point indicated by the dotted line 3 3 in Fig. 6, the position of the machine being similar to that shown in Fig. 1; Fig. 4, a transverse vertical sectional view showing the upright portion of the machine in front elevation, (the table and its supports being cut away,) the point of view being indicated by the dotted line 4 4 in Fig. 3 and the direction of sight by the arrows at the ends of said dotted line; Fig. 5, a detail sectional elevation as seen when looking in the direction indicated by the arrows from the dotted line 5 5 in Fig. 4; Fig. 6, a top or plan view of the machine as a whole, except that a fragment of the cam-disk above the table is shown as broken away in order to illustrate the construction and operation thereof more clearly; Fig. 7, a horizontal sectional view, on an enlarged scale, as seen when looking downwardly in the direction indicated by the arrows from the point indicated by the dotted line 7 7 in Fig. 3; Fig. 8, a similar view as seen from the point indicated by the dotted line 8 8 in Fig. 3; Fig. 9, a detail sectional view of one of the molds and immediately adjacent parts, similar to a portion of Fig. 3, but on a considerably-enlarged scale; Fig. 10, a detail horizontal sectional view as seen when looking downwardly from the dotted line 10 10 in Fig. 9; Fig. 11, a view similar to a portion of Fig. 9, except that the mold-bottom is wholly removed to enable the groove or way by which said bottom is supported and in which it travels to be fully shown; Fig. 12, a top or plan view of one of the molds in closed position, being a view similar to a portion of Fig. 6, but on an enlarged scale, one portion, however, being shown in section; Fig. 13, a detail sectional view as seen when looking in the direction indicated by the arrows from the point indicated by the dotted line 13 13 in Fig. 12, showing the mold in rear elevation; Fig. 14, a sectional view showing a detail of the adjusting means for the springs forming part of the mold-side-operating devices as seen at the point indicated by the dotted line 14 14 in Fig. 12; Fig. 15, a detail sectional view of the lower portion of the pressing-mold, especially illustrating the valve in the bottom of said mold, said view being similar to a portion of Fig. 3, but on a considerably-enlarged scale; Fig. 16, a detail sectional view as seen when looking downwardly from the dotted line 16 16 in Fig. 4, showing especially the relation of the shafts and gearing at that point; Fig. 17, a vertical sectional view at the point indicated by the arrows from the dotted line 17 17 in Figs. 7 and 8; and Fig. 18, a detail sectional elevation of the upper end of the plunger-shaft and immediately adjacent parts, as seen from the dotted line 18 18 in Fig. 4.

These machines are designed to be self-contained and portable. They are therefore provided with ground-wheels 21 and axles 22 and 23, upon which the main base-frame 25 is mounted. Upon this base-frame are the members of the framework which immediately carry the table and the mechanism, Said frame members will be referred to more particularly hereinafter as occasion may arise.

It may here be stated that this machine consists, generally speaking, in a horizontally-positioned mold-carrying table capable of advancing with a step-by-step motion, a series of pressing-heads or plungers adapted to successively coöperate with the pressing-molds in giving the charges of glass their initial form, and a suitable operating mechanism, and blowing devices, timed to operate in proper relation, there being a series of several pressing and blowing parts, a part of which are in operation and a part of which are idle at all times, thereby enabling the machine to be in continuous operation without requiring the continuous use of all its instrumentalities, so that a sufficient time is permitted to elapse between the successive uses of each instrumentality to enable the same to properly cool without interrupting the continuous operation of the machine. In this way I am enabled to achieve one of the leading objects of my invention—namely, to produce a machine capable of enduring continuous operation without having any of its parts become overheated and without providing water-cooling devices, the use of which has heretofore been considered indispensable, but which nevertheless have been recognized as seriously objectionable for reasons well known to those skilled in the art.

Upon a central main standard or column 31 is mounted the revolving table 32, carrying the molds and the mechansim whereby the same are manipulated. These molds are in many respects similar to those shown and described in my Letters Patent No. 608,022, dated July 26, 1898, each of them consisting of two halves, 33 and 34, hinged to a knee 35 by a hinge-pin 36, and adapted to open and close by being swung on said hinge-pin. In operation the table 32 revolves upon the central standard or column 31, which serves as a shaft therefor. Secured also to said column or standard 31, above the table 32, is the stationary cam-plate 41, having a cam channel or groove upon its under side, the form of which is best shown by the dotted lines in Fig. 6 and the construction of which is shown in the detail view Fig. 9. A yoke 42 for each of the molds is carried by a tailpiece 37, extending out from the knee 35, to which the mold halves are hinged. Each of these yokes has an engaging projection, (preferably in the form of an antifriction-roller 43,) which extends up into the groove or way in the under side of the cam-plate 41. The ends of the yokes 42 are respectively connected to ears on the sides of the mold halves by yielding and adjustable connecting-rods. These, as generally shown in Fig. 6 and as more completely shown in Figs. 12, 13, and 14, are each composed of two parts 44 and 45, united to the end of the yoke and an ear on the mold half, respectively, by pivot-pins 46 and 47, and having an interposed tie-bolt 48 and a spring 49, as best shown in Fig. 12. The head of the tie-bolt 48 rests between the sides of the clip 45, while the screw-threaded end of said tie-bolt enters a correspondingly-screw-threaded perforation in the stem of the clip 44. The length of these yielding and adjustable connecting-rods can be easily and accurately adjusted by simply removing the pivot-pin 47 and revolving the clip 45, carrying the tie-bolt, which will screw it up or unscrew it to any desired extent, the spring 49 yielding accordingly. The operation is when the mold sides are closed together that they will be pressed strongly against each other by these yielding connecting-rods, which are adjusted so that said halves will be held against each other closely by the spring force exerted by the springs 49, thus insuring that said mold halves come tightly together at each operation, so as to be engaged and held closely and securely by the clamping-forks (which will be hereinafter described) during the molding and blowing operations. The shaft of the roller 43 extends down through and is guided by a slot formed for the purpose in the tailpiece 37. As the mold halves are held from radial movement toward or from the center of the structure they will obviously be caused to shut and open as they pass around with the table on which they are mounted by means of engagement of the roller 43 with the cam-groove in the under side of the plate 41, the operation being to pull or push upon the yoke 42, and thus, through the arms of said yoke and the connectors between the same and the ears on the mold halves, swinging the latter toward or from each other at various points in the revolution of the table. The positions which these parts assume from time to time are indicated in Fig. 6, each of the molds being shown accurately as to its position and relation to the others and to the other parts of the machine in said figure.

In order that the pressing-molds may come into operation at the proper time, it is necessary, as is well understood, for the bottoms of the blowing-molds (the operation of the sides of which has just been described) to be moved into and out of operative relation with said sides at the proper times. Each of these bottoms 51 (see especially Fig. 9) is provided with a downwardly-extending arm 52, by means of which said bottom can be moved back or forth out of or into operative relation with the mold sides 33 and 34 by engagement with suitable cam-arms. Said bottoms 51 are appropriately mounted in grooves or ways 53 for this purpose, as best shown in Figs. 9, 10, and 11. The arms 52 extend down through slots in the table 32, as shown. The cams which operate the moldbe arms through these arms are best shown in Fig. 7. They are forced out at the proper time by a contact-piece 54 on the upper end of a swinging lever which is pivotally mounted, as by pivot 55, upon an adjacent portion of the framework and is connected at the other end to a pitman 56, which runs back and engages with and is driven by a suitable cam-groove in the opposite side of the double cam-wheel 83 on the shaft 128. Said pitman 56 is bifurcated and passes astride the shaft 128, as best shown in Figs. 3, 8, and 17. The lever-arm is composed of two parts 54$^a$ and 54$^b$, united by a variety of rule-joint, the pivot whereof is also the pivot 55, and the member 54$^a$ is adapted to yield in respect to the member 54$^b$ by a compression-spring 54$^d$, mounted upon a bolt 54$^c$, all as clearly shown in Fig. 17. The purpose of this last-named construction is to permit this arm to yield in case any obstruction should get behind the mold-bottom when it is being forced forward, and thus prevent breakage. The spring and other parts are so proportioned, however, as not to yield under the ordinary work which the device is called upon to perform. As the table revolves after the operation last above described the pins 52 of the mold-bottoms escape from the contact-piece 54 on the upper end of the arm. The blowing operation takes place at the next stop, and in order that the mold-bottom shall be certainly held to position during and immediately prior to this operation I provide the further yielding holding-arm 57, which comes in contact with the arm 52, and thus effectually holds the mold-bottom forward. This arm 57 is pivoted at 58, and a tension-spring 59 serves to hold it forward with the required force. These mold-bottoms remain in their forced-out position for a considerable portion of the revolution of the table by which they are carried; but after the completed article has been removed from the mold they are pulled in again, so that the pressing-mold may operate (as will be presently described) by means of the cam 60, as shown in Fig. 7, and thus remain until they are again operated by the contact-piece 54.

A series of pressing-molds equal in number to the blowing-molds and registering therewith are also carried by the table 32, which has an annular shelf 38, secured at a suitable distance below the main portion by means of distance-blocks or supports 39. Upon this ring or shelf 38 I mount these pressing-molds 61, each of which is provided with a downwardly-extending arm 62, having a notch in one side of its lower end. This arm is shown as in the form of a round rod with a spline in one side to prevent it from turning. For the greater part of the revolution of the table each of these pressing-molds remains in its lower position, as shown especially at the right-hand side of Fig. 3. During the pressing operation, however, they are raised up to within the blowing-molds, to the position indicated at the left side of the table in said Fig. 3. The raising takes place just before the introduction of the charge of glass to be treated, which occurs in each case when the mold is at the position $x$, Fig. 6. This raising is done by means of the arm 63, carrying the antifriction-wheel 64, said arm being operated by cam 65, which engages with antifriction-roller 66 on arm 63. The wheel 64, as best shown in Fig. 8, only extends to half-way across the end of the arm 62, thus leaving a free surface on said end with which another part may engage. The driving-arm 71 of the table structure is provided with an extension 67, which after the arm 62 has been thus raised comes back to beneath the remaining portion of said arm, and as these parts then move forward in unison to the next position (as will be presently described) the said arm and its pressing-mold are held upwardly until they reach said next position. At this point the notch in the lower end of the arm 62 passes onto a projecting flange or ledge on the vertically-reciprocating block 81, (see Figs. 3 and 17,) and said arm and its pressing-molds are thus supported, although the arm 71, carrying the wing 67, presently moves back to repeat its operation. This block 81 is operated by an arm 82, the end of which enters a mortise-like opening therein, and said arm in turn is operated by the cam-wheel 83, said arm having a roller 84 mounted on one side of it, which enters the groove in the side of said cam-wheel, said arm itself being pivoted at its far end upon the pivot-shaft 85. It is necessary that this arm 82 fit tightly into the mortise-like opening in the block 81 and that means of taking up wear shall be provided. I therefore mount upon said arm (near its swinging end where it engages with said block) a member 86, which extends out parallel with the main portion thereof, and provide an adjusting-screw 87, by means of which the position thereof may be adjusted and regulated. By this means I am able at all times to prevent any lost motion between these parts.

The arm 82 alone would not be strong and rigid enough to properly support the downward thrust of the plunger as it comes into the pressing-mold. I therefore provide a movable latch 91, which is carried strongly by the framework of the machine and which before the plunger operates moves forward to beneath the block 81 and strongly supports it. The operation of this latch 91 will be presently described in connection with the other parts with which it operates. When the operations just described have taken place, the pressing-mold is in its raised position within the blowing-mold, as indicated, and having previously received the charge of molten glass is ready for the pressing operation.

The latch 91 and also the table-locking latch 92 are mounted upon a swinging arm 93, which is pivoted (at 94) upon the framework and is held inwardly toward or into engagement by the tension-spring 95. Said arm and the latches carried thereby are from time to time forced out of engagement by the cam 96 on the main driving-shaft, which operates against an antifriction-truck 98, mounted suitably on said arm 93, all as best shown in Figs. 3 and 17.

As before stated, I prefer to make this machine self-contained and portable. In carrying out this preference it is most conveniently electrically driven. I have shown an electric motor M, mounted on one of the columns of the main frame and belted to a driving-shaft 100, the pulley 101 whereon may preferably either run loosely or be thrown into engagement therewith, so as to drive said shaft 100 by means of clutch 102. This clutch 102 is adapted to be operated by a lever 103, a connecting-rod 104, and a hand-lever 105, which is conveniently positioned in front of the table, where it may be easily reached by the operator, so that the machine may be conveniently started and stopped at will without stopping the motor. The lever 103 is mounted on a rock-shaft R, and this shaft at a convenient point carries another hand-lever L at the rear of the machine, by means of which the clutch may be thrown into and out of engagement, and the machine thus started and stopped from this point. Upon the shaft 100 is a worm-gear 106, which engages with the screw-gear 107 on the main driving-shaft of the machine, and thus drives said main shaft at a comparatively slow speed, but very strongly and steadily, as is highly desirable in a machine of this character. This main shaft of this machine 108 is, as best shown in Figs. 7 and 8, a crank-shaft, and it bears several cams and grooves by which various parts of the mechanism are actuated, as elsewhere described in detail. From one crank of this main shaft a pitman 111 runs forward and engages with an arm 112, which is mounted and adapted to swing upon the central column 31, said arm 112 being upon the same hub as the arm 71, so that said hub and both said arms are either integral or rigidly connected. Within the inner edge of the annular shelf 38 of the table structure are a series of notches, and with these a latch 72 on the arm 71 is adapted to successively engage. The stroke of the pitman 111 is just sufficient to swing the structure so that the point of the arm 71, carrying this latch 72, will just swing the distance between each of these several notches, there being one notch for each of the molds. The result is that as the shaft 108 is rotated the table carrying the molds is advanced a space just equal to the distance between two molds, so that each of said molds is successively brought to each of the several positions. As best shown in Fig. 7, the latch is tapered upon one side and square upon the other and is spring-mounted, and is thus enabled to release itself from the notches when moving back and to engage therewith and drive the table with certainty when moving forward. The table member or shelf 38 has also another series of notches on the outer edge. With these the latch 92 (previously described) engages when the table has been moved forward to an operative position, and said table is thereby securely held during the molding operations, the mechanism in question being timed to operate so as to withdraw this latch 92 when the table is ready to move forward and to permit it to engage after the forward movement is effected and to remain engaged until the molding operations are completed and the table is ready for another movement. The table is thus held during the molding operations strongly and with certainty.

Upon the main shaft 108 is a spur-gear 121, which engages with a combined spur and bevel gear 122 on a stud-shaft 123, and said last-named gear engages with a corresponding bevel-gear 124 on a counter-shaft 125, which in turn has a bevel-pinion 126, which engages with a bevel-gear 127 on a shaft 128. This shaft 128 bears the cams 65 and 83 already referred to, and it also bears a cam 131, which operates the connecting-rod 132, and which latter, through the walking-beam 133, operates the blowing-head 134. This blowing-head, being substantially the same as that shown and described in my Patent No. 608,022, above referred to, is not illustrated as to its interior construction and need not be further described herein. It is connected to the flexible air-pipe 135, which leads to a suitable source of supply of compressed air. (Not shown.) For constructive reasons I connect the lower end of the connecting-rod 132 to an arm 136, one end of which is mounted on the pivot-shaft 85, and the other of which, just below where it is pivoted to said connecting-rod, bears an antifriction-truck 137, against which the cam 131 immediately operates. As best shown in Figs. 2 and 6, the piston 138 of the blowing-head also carries a fork 139, which when the head is forced down engages with suitable projections p upon the sides or halves 33 and 34 of the blowing-molds, and thus holds said halves tightly and strongly together during the blowing operation.

Upon the ends of the main shaft 108 I place a pair of preferably counterbalanced crank-arms 141 and 142. The wrist-pins on these crank-arms carry connecting-rods 143 and 144, by which a cross-head 145, mounted in ways in the upper portions of the main side columns 26 and 27 of the framework, is driven. Centrally mounted in said crosshead is a shaft 146, which has a bearing at its lower end in the sleeve 147, which sleeve is mounted on a cross-bar 28, extending between the main upright columns or standards and forming part of the framework, as best shown in Fig. 4. Loosely sleeved upon the upper end of said shaft, which at this point is of a smaller diameter, is the pawl-housing 151, which carries the pawls 152 and is provided in its sides with spiral grooves 153, which engage with studs 154, preferably armed with antifriction-rollers 155 and which are carried by the upper cross-bar 29 of the framework. These spiral grooves extend that fraction of a circle around the axis of the shaft which is equal to the number of presser-heads carried by said shaft. In the illustration, as six presser-heads are shown, these grooves extend spirally one-sixth of the circumference of the circle through which the device containing them travels. Immediately below this pawl-housing I secure rigidly to the shaft a notched plate 156, with which the lower ends of the pawls 152 are adapted to engage. The lower ends of these pawls are beveled, so as to escape from these notches in the backward movement, and are formed to engage with said notches, and thus propel the plate and the shaft 146, to which said plate is secured, in the forward movement. As the cross-head rises and falls, therefore, the shaft is propelled in a step-by-step movement, each step in the arrangement shown being one-sixth of a revolution, and this brings the presser-heads into alinement with the pressing-molds at the required point, the mechanism being such as to time these parts accurately to accomplish the desired result.

About midway the shaft 146 it is enlarged somewhat, and the ends of the enlarged portion are screw-threaded. The presser-head housing 171 is mounted upon this enlarged portion and is there held by the nuts 172 and 173 By this construction I am enabled to adjust this housing accurately both rotatively and longitudinally of the shaft. Upon this housing 171 I mount a series of pressing-heads, six being the number shown. Each of these pressing-heads as constructed embodies a molding member 174 and a stem 175, the latter of which is secured by means of a collar 176 and a nut 177 firmly and rigidly to the housing 171. The stem 175 continues on up a considerable distance and is surrounded by a compression-spring 178. Each molding member 174 is surrounded by a stripper 179, which stripper is normally held downwardly against the upper end of said molding member by means of said spring 178, operating through a plate 180, and pins or fingers 181, which pass down through suitable perforations in the plate of the housing 171 and bear upon the upper surface of said stripper. When, however, the molding member comes into operation and is forced into the molten glass, this stripper comes against the upper surface of the closed mold and the spring permits it to yield on upwardly, so that it is a combined mold-cover and stripper in operation. As the molding member rises the stripper is forced down by the force of the spring 178, thus preventing the glass from moving upwardly with the molding member, which if permitted might distort it. In other words, it strips off the blank which has been formed by this part of the molding operation and leaves it in the mold, ready for the subsequent or blowing operation.

The cross-head 145 is capable of moving longitudinally along the shaft 146, and as said cross-head is started in its descending movement it separates somewhat from the pawl-plate 156. In other words, the shaft is not moved downwardly directly by the cross-head. Said cross-head is, however, provided with a stem 185, which is surrounded by a compression-spring 186, and said stem is so arranged that it comes directly in line with and above the stem 175 of the mold member, and thus operates directly on said mold member, and through the stem and the housing 171 carries the shaft downwardly by means of the force applied to the cross-head. At the time of this portion of the molding operation as the cross-head is otherwise free to move longitudinally of the shaft somewhat if any obstruction gets beneath the mold member or if by any accident its work is too heavy the spring 186 will permit an upward yielding, and thus the machine is protected from breakage in this operation.

The vertically-reciprocating parts are quite heavy and of themselves would not only require considerable power to raise them, but would descend with a damaging force. I therefore provide counterweights 148, hung upon chains or cords 149, the other ends of which are connected to the cross-head 145 and help to sustain the weight thereof and soften the force of the descent of it and parts connected thereto.

It is necessary that the rotating housing carrying the presser-heads shall be located strongly and accurately to position during the pressing operation. I therefore mount in suitable bearings 191 and 192 on one of the main frame-columns of the machine a locking-bar 193, which by means presently to be described will approach and recede from said housing at the proper points in its revolution and provide in the edge of the circular plate or ring forming the bottom of said housing a series of notches corresponding in number to the number of pressing-heads carried thereby. This locking-bar 193 is attached (approximately centrally) to one arm of the bell-crank lever 194, and the other arm of said bell-crank lever is connected to a rod 195, which extends down and is operated by a cam 196 on the main shaft 108, the lower end of said rod (where it comes in immediate contact with said cam (being armed by an antifriction-roller 197, which as well as said rod is held accurately to position by a distance-bar 198, connected thereto and mounted at the other end on a pivot 199. As shown in Fig. 4, the bearings 191 and 192 are elongated in one direction, so that while the latch-bar 193 is held firmly thereby against any pressure which might be exerted by the rotative movement of the housing carrying the pressing-molds it is free to move toward and from said housing a limited distance, and thus be engaged with or be freed from the notches in said housing, as the case may be. The cam 196 and bell-crank lever 194 are so constructed and arranged as to cause this locking-bar to take the proper position at the proper times in the operation. The locking-bar is forced back out of the notches by the upward pressure occasioned by the cam as its larger side comes in contact with the roller 197, while the weight of the structure causes said locking-bar to fall forward against the edge of the annular rim of the housing 171 as soon as said larger portion of the cam has passed, so that it engages with the notch immediately upon the arrival of the latter to the predetermined position.

It is of course necessary that the sides 33 and 34 of the mold should be held together so as to properly sustain the lower member of the pressing-mold while the latter is in position to receive the pressure of the pressing-mold. I have therefore provided a slide 201 upon the front of the bearing 147 and mounted upon this slide a fork 202, which will engage with the projections $p$ on the mold halves in a similar manner as the fork 139 does. This slide is moved up and down at the proper times, and thus out of or into engagement with the projections on the mold halves, by means of a rod 203, which extends down and engages with an arm 204, which arm is pivoted on the same pivot-shaft 199 as the arm 198 and is operated by a cam 205 on the main shaft 108, as best shown in Fig. 17.

In the operation of this machine, as heretofore indicated, one of the pressing-molds is raised up to position by means which have been described, and afterward a charge of molten glass is placed therein. This molten glass comes in a form in which it is most effectively handled by being cut off by shears. I have therefore provided upon the stationary plate 41 a stationary shear blade or member 211, which extends out above that point where the mold is situated to receive its charge of glass and alongside the center of such position. A second shear-blade 212 is pivoted on said stationary blade 211 and is connected by a connecting-rod 213 to a bell-crank lever 214, which is pivoted to the main framework, as by pivot 215. The reciprocating cross-head 145 is provided with the projection 216. The bar 217 is mounted in bearings 218 and 219 on the framework and has adjustable strikers 220 and 221 secured thereto at points above and below said projection 216, respectively, so that as the cross-head travels up and down said projection will come in contact with said strikes and move said bar upwardly and downwardly at the time of contact. Extending down from said bar 217 is a hook 222, which is adapted to engage with a like hook 223 on one arm of the bell-crank lever 224. As the bar 217 is moved downwardly the hook end of the part 222 will pass below the hook 223 and strike the finger 224, thus rocking said bell-crank lever on its pivot, and, through the rod 213, pulling upon the shear. On the upward movement of the cross-head the parts are so arranged that the hook on the member 222 will engage with the hook 223 on the bell-crank lever and move it in the reverse direction, thus closing the shear and cutting off the charge of glass which is introduced at this time. The stationary shear-blade 211 is preferably hollow and is provided with pipes 226, connected to the chamber therein, through which a cooling fluid may pass. The joint of said shear is lubricated from a lubricating-cup 227 through tube 228. When the mold is thus filled with its charge of glass, it is moved forward to below the presser-head, which at the time is ready for operation, and the pressing operation is performed, as has already been indicated. It is necessary, however, that after the pressing operation and as the pressing-mold is withdrawn to permit the blowing operation that air shall be admitted below the partly-formed article in the pressing-mold to prevent suction. I therefore provide in the bottom of each of these pressing-molds 61 a valve 232, which will be closed during the pressing operation, but which will easily raise and admit the necessary air to prevent a vacuum as the mold is withdrawn. The stem 62 of said pressing-mold is therefore provided with a perforation 233, entering from one side and joining with a vertical perforation 234, leading up to the valve 232. At a point just below the surface of said valve the sides are cut away, so that when it rises in the mold-cavity there will be a free air-passage via the perforations 233 and 234 and the space left by thus cutting the sides of the valve away into said mold-chamber. The suction will, of course, raise this valve as the mold is withdrawn. In order to prevent this valve from moving too far, I provide a transverse opening 235 in the base of the mold, into which I put a small pin 236, which permits said valve a limited movement only, as best shown in Fig. 15. There are, as above indicated, a plurality of these molds, in order that they shall not all be in operation at any one time. This, as before stated, is to prevent them from getting too hot in operation without the necessity of using any water cooling means. I find it advantageous, however, to provide an air cooling means which aids in keeping the temperature reduced. In the base 25 of the frame I have therefore provided an air-chamber 20, extending around through a considerable portion of the circumference thereof, and out of this I lead small pipes 241, the nozzles of which are positioned alongside the points where the pressing-molds stop when at rest, so that they are continually subjected, while in their at-rest positions, to blasts of air upon their opposite sides. These air-blasts are supplied from any suitable source, (not shown,) generally the same as that whence the supply of air for the blowing operation is obtained.

Having thus fully described my said invention, what I claim as new, and desire to secure by Letters Patent, is—

1. The combination, in a glass-blowing machine, of a revoluble table, a series of blowing-molds and a series of pressing-molds carried thereby, said pressing-molds being supported by a portion of the table below the point of support of the blowing-molds, guiding-stems extending downwardly from said pressing-molds through the table portion upon which they are mounted, which stems are provided with notches, means timed to contact with the lower end of each of said stems at the proper point in the rotation of the table and push the same upward, thus raising the pressing-mold to within the blowing-mold, said means being positioned to engage with a portion of the end of said stem only, an arm mounted to vibrate horizontally upon the central standard whereon the table is mounted and to pass beneath the remainder of the end of the said stem and support the stem while it is being carried forward to the next position, and locking means arranged at said next position for locking said stem during the pressing operation, and other means for withdrawing said stem and mold after the pressing operation is completed.

2. The combination, in a glass-blowing machine, of a revoluble mold-carrying table, molds comprising halves or side portions hingedly mounted on said table, a non-revoluble cam-plate secured adjacent thereto around which the molds pass as the table revolves, connections between said cam-plate and the mold halves, and radially-arranged guides on which said connections are mounted, whereby the movement thereof occasioned by the engagement with the cam-plate is caused to be radial and thus to open and close the mold halves.

3. The combination, in a glass-blowing machine, with a mold composed of hinged halves, of a yoke mounted behind the hinge-pintle, means for actuating said yoke toward and from the mold, and yielding adjustable connections between said yoke and the mold halves.

4. The combination, in a glass-blowing machine, with a mold composed of two halves hingedly connected together, of means for swinging said halves on the hinge-pintle, comprising a member movable toward and from said pintle and other members connecting said member with the sides of the mold halves; each said connecting member being composed of suitable ends, a tie-rod connecting said ends, and a spring interposed between said ends.

5. The combination, in a glass-blowing machine, with a mold comprising two halves hingedly connected together, of means for swinging said halves on the hinge-pintle, comprising a member movable toward and from said pintle, and other members connecting said member with the sides of the mold halves, each of said connecting members being composed of suitable ends, a screw-threaded and adjustable tie-rod connecting said ends, and a spring interposed between said ends.

6. The combination, in a glass-blowing machine, with a mold comprised of two halves hingedly connected together, of means for swinging said halves on the hinge-pintle comprising a member movable toward and from said pintle and other members connecting said member with the sides of the mold halves, each of said connecting members being composed of suitable ends, a tie-rod connecting said ends, and a spring interposed between said ends; said tie-rod being sleeved within one of said ends between the sides of which its head is held and threaded into the other end, whereby, by revolving one of said ends, the total length of the connection is adjusted.

7. The combination, in a glass-blowing machine, of a table, molds mounted thereon composed of sides and a bottom, said bottom being slidably mounted below said sides, a cam-operated lever whereby said bottoms are forced to below said mold at one point in the revolution of the table, and a cam whereby said bottoms are withdrawn from below said mold at another point in the revolution 8. The combination, in a glass-blowing machine, of a table, molds mounted thereon comprising sides and a bottom, means for moving said bottom to and withdrawing it from beneath the mold, the means for moving it to beneath the mold consisting of a contact-piece, and mechanism for operating the same; said mechanism embodying a lever containing a yielding rule-joint whereby a yielding is provided for in case of obstruction.

9. The combination, in a glass-blowing machine, of a revolubly-mounted table, molds carried thereby, movable bottoms to said molds, a cam whereby at a point in the revolution of the table each mold-bottom is withdrawn from beneath its mold, a movable contact-piece whereby at another point in the revolution of the table said mold-bottom is moved to beneath its mold, and means connected with the table-revolving mechanism for actuating said contact-piece synchronously with the arrival of the mold at the predetermined point.

10. The combination, in a glass-blowing machine, of a revoluble table, molds mounted thereon, movable bottoms to said molds, means for moving said bottoms from beneath said molds at one point in the revolution of the table, means for moving said mold-bottoms back beneath said molds at another point in the revolution of the table, and means for yieldingly holding said mold-bottoms in place beneath the molds for a period after the operation of the last-mentioned means.

11. The combination, in a glass-blowing machine, of a revoluble table, a series of pressing-molds carried thereby, each pressing-mold being provided with a downwardly-extending stem, means for raising the pressing-molds arranged to come in contact with a portion only of the end surface of said stem, and other means for sustaining said pressing-mold during the succeeding forward movement arranged to engage with the other portion of the end surface of said stem.

12. The combination, in a glass-blowing machine, of a revoluble table, pressing-molds carried thereby, means for raising said pressing-molds at a predetermined point to their upper position, means for carrying said pressing-molds forward a certain distance after being raised, a vertically-moving member with which a stem on the mold will engage when moved to said last-named position, means for locking said member firmly during the pressing operation, means for withdrawing said locking devices after the pressing operation is completed, and means for forcing down the device which is connected to said stem and thereby withdrawing said pressing-mold to a position ready for the next forward movement.

13. The combination, in a glass-blowing machine, of a revoluble table, a series of pressing-molds mounted thereon, each mold being provided with a stem, means operating upon said stem for forcing said mold upwardly and downwardly, the means for forcing the same downwardly consisting of a sliding block containing a mortise and a vibrating bar one end of which enters said mortise, said end being provided with adjusting means whereby it is caused to bear tightly against the opposing surfaces within the mortise.

14. The combination, in a glass-blowing machine, with the pressing-molds, of a vertically-arranged shaft, a cross-head mounted and permitted a limited movement upon said shaft, a series of pressing-heads carried by said shaft, means for revolving said shaft and thus bringing said pressing-heads successively into operative relation with said pressing-molds, and a contact member carried by said cross-head arranged above the operative position of the pressing-heads and adapted to force each pressing-head downwardly at the predetermined time.

15. The combination, in a glass-blowing machine, with the pressing-molds, of a series of pressing-heads arranged to be brought successively into operative relation with the pressing-mold, a cross-head having a contact device arranged to come in contact with the pressing-head, said cross-head being movable in relation to said pressing-heads, and yielding contact devices interposed between the cross-head and the pressing-head.

16. The combination, in a glass-blowing machine, with a pressing-mold, of a series of pressing-heads arranged in operative relation thereto, a shaft on which said pressing-heads are mounted, a pawl-plate secured to said shaft, and a pawl-housing rotatably mounted on said shaft and provided with grooves having a spiral direction, pawls carried by said housing adapted to engage with said pawl-plate, an adjacent framework having projections which engage with said grooves whereby the shaft is given a step-by-step rotary movement as the same is reciprocated, and means for reciprocating said shaft.

17. The combination, in a glass-blowing machine, of a vertical shaft, means for reciprocating said shaft, a housing mounted on said shaft and adjustable both longitudinally of and rotatively upon said shaft, said adjustments being independent of each other, and a series of pressing-heads mounted in said housing.

18. The combination, in a glass-blowing machine, of a pressing-mold, a series of pressing-heads arranged adjacent thereto and rotatively mounted, locking devices arranged in suitable relation thereto, and mechanism connected with the mechanism for rotating the series of pressing-heads whereby the locking devices are operated at predetermined times and the pressing-heads thus held accurately to position during the pressing operation and released upon the completion thereof.

19. The combination, in a glass-blowing machine, of a revoluble table, molds mounted thereon, a shear positioned above one of said molds, a reciprocating bar arranged adjacent thereto, and a bell-crank lever connected to one of the shear-blades and arranged to be operated by said reciprocating part, said bell-crank lever and said reciprocating part having interengaging separable hook-like projections, whereby the reciprocating part may have a movement greater than that required to operate the shear.

20. The combination, in a glass-blowing machine, of a horizontally-positioned revoluble table, a series of blowing-molds and a series of pressing-molds carried thereby, pressing-heads arranged to coöperate with the pressing-molds as they arrive respectively at a predetermined point, a rocking sleeve whose axis is the same as that of the table, an arm on said sleeve, a radially-movable latch carried by said arm and adapted to engage with notches in an adjacent surface of a table-rim, mechanism for actuating said latch, and mechanism connected to said sleeve having a movement equal to the distance between the respective molds, whereby, by the rocking of said sleeve, the table is given a step-by-step rotary movement and the molds thus brought successively into operative relation with the coöperating parts.

21. The combination, in a glass-blowing machine, of a pressing-mold provided with a perforation leading from its bottom end to the outer air, and a transverse opening passing therethrough, of a small valve seated in and forming part of the bottom of said mold and having its top portion formed to fill the perforation therein, and having recesses in its sides beginning shortly below its mold-surface and serving as air-passages, a support upon which the lower end of said valve rests when in its lowermost position, and a stop by which its upward movement is limited, substantially as and for the purposes set forth.

22. The combination, in a glass-blowing machine, of a revoluble table, a continuously-rotating shaft, an arm operated by said shaft to intermittently engage the table and drive the same step by step in one direction only, a series of blowing-molds carried on one member of said table and adapted to be opened and closed at successive points of the rotation, means for automatically causing said opening and closing, a series of pressing-molds carried by another member of said table and each adapted at a suitable point in the movement to be raised within a blowing-mold, means substantially as described for so raising said pressing-molds, means for automatically locking each of said pressing-molds in its raised position at the operative point, a vertically-moving plunger adapted to coöperate with said pressing-mold at said operative point, means for withdrawing said pressing-mold when the pressing operation has been completed, and means at the next operative point for automatically bringing the blowing-mold into operation.

23. The combination, in a glass-blowing machine, of a revoluble table, means for revolving said table, a series of blowing-molds carried by said table, a series of pressing-molds also carried thereby at a point below the blowing-molds, downwardly-extending stems on said pressing-molds, means connected with the table-revolving mechanism which automatically engages with the stems of said pressing-molds successively and raises each of them as it arrives at a predetermined point to a position within the corresponding blowing-mold, means for automatically locking said pressing-mold into position when raised during the pressing operation, and automatic means for releasing and automatic means for withdrawing said pressing-mold after the pressing operation is completed.

In witness whereof I have hereunto set my hand and seal, at Muncie, Indiana, this 7th day of December, A. D. 1904.

ALVAH L. BINGHAM. [L. S.]

Witnesses:
  FRANK C. BALL,
  G. A. BALL.